Nov. 21, 1939.   J. W. KUHN   2,180,876
INDIVIDUAL PNEUMATIC SUSPENSION SYSTEM
Filed July 17, 1936   4 Sheets-Sheet 1
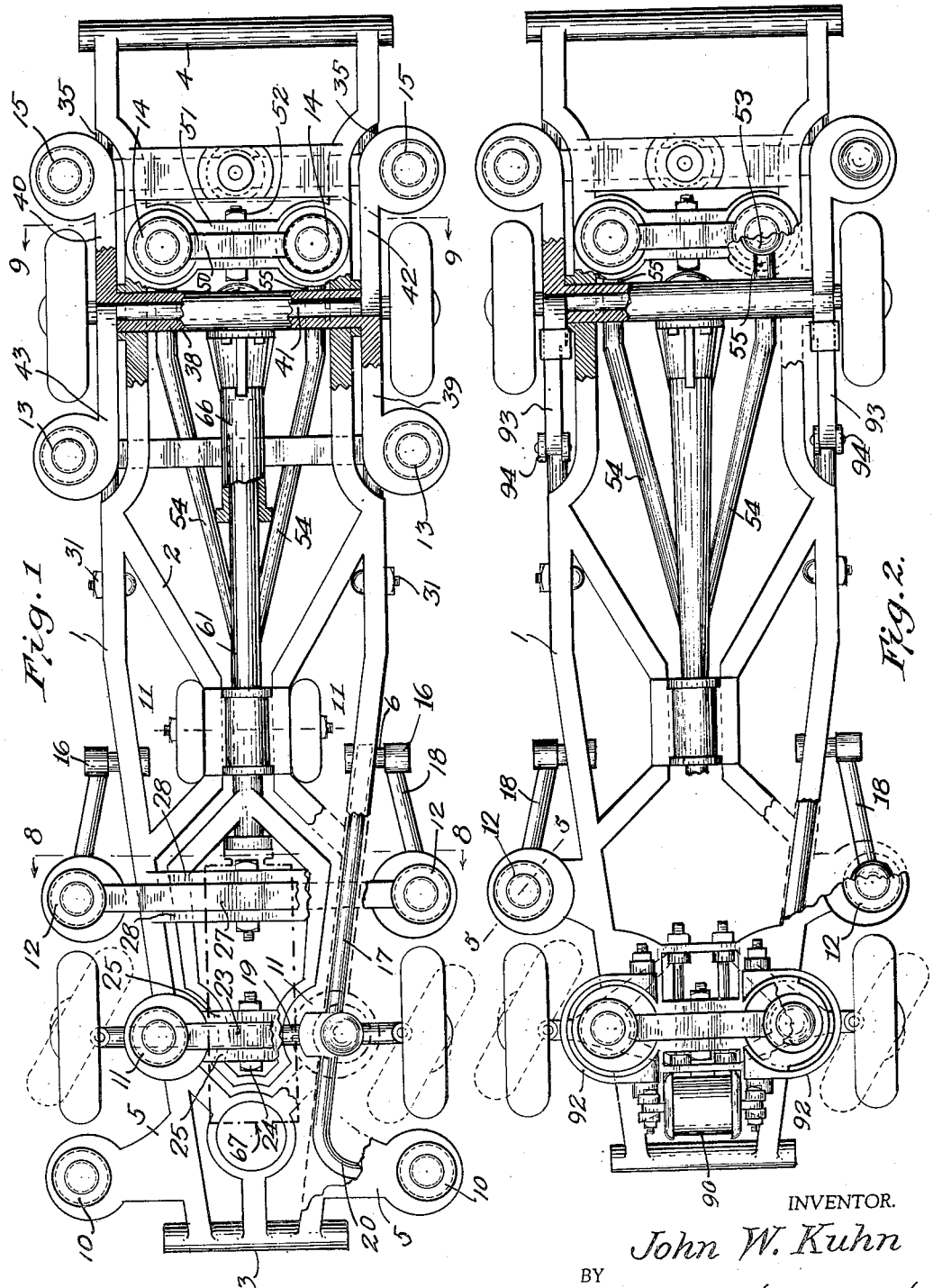
INVENTOR.
John W. Kuhn
BY
Eccleston & Eccleston,
ATTORNEYS Nov. 21, 1939.   J. W. KUHN   2,180,876
INDIVIDUAL PNEUMATIC SUSPENSION SYSTEM
Filed July 17, 1936   4 Sheets-Sheet 2
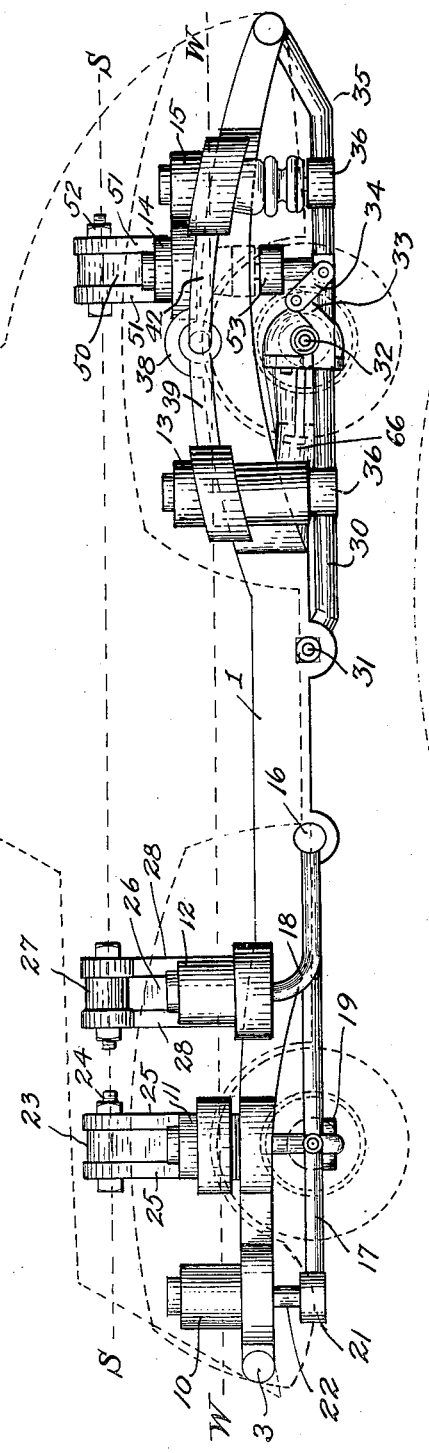
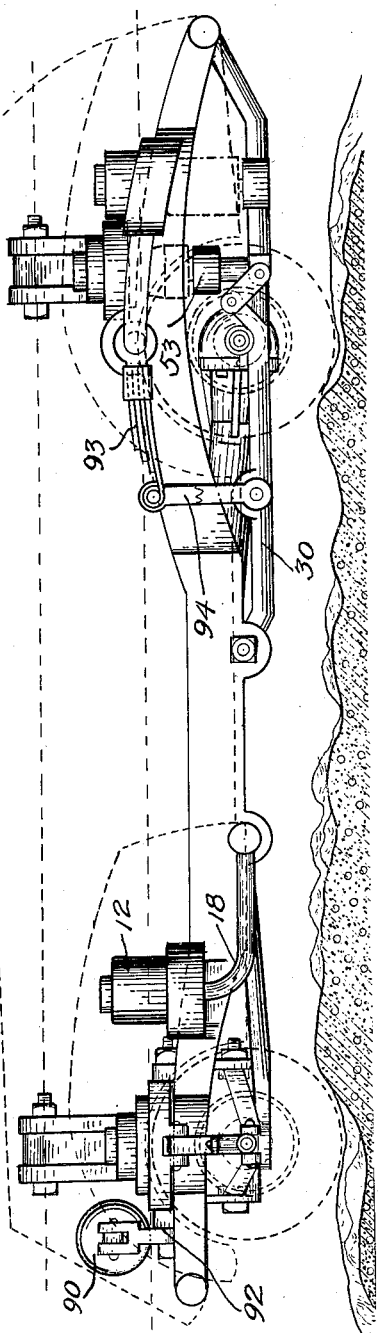
INVENTOR.
John W. Kuhn
BY
Eccleston & Eccleston
ATTORNEYS

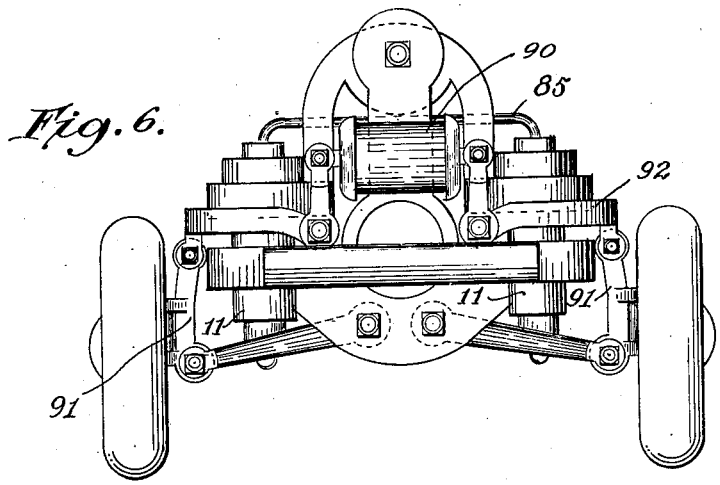
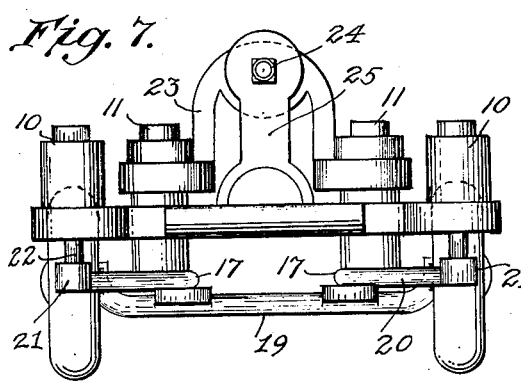
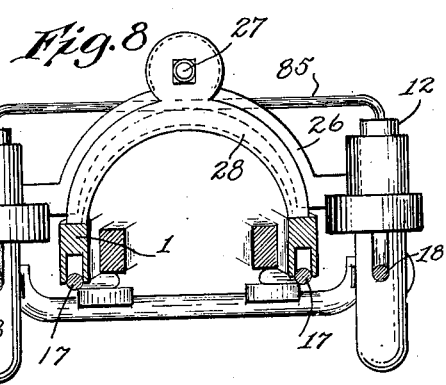
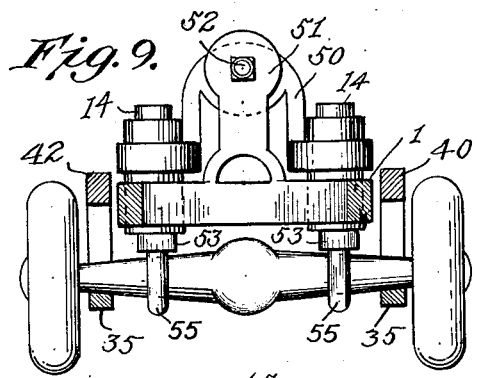
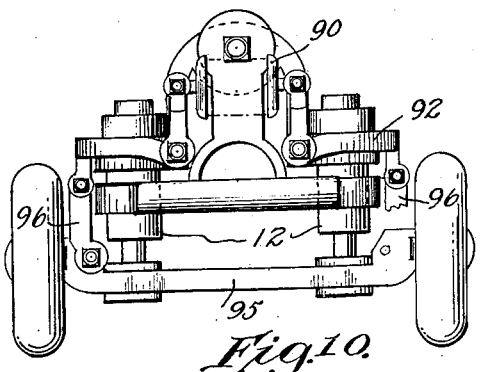
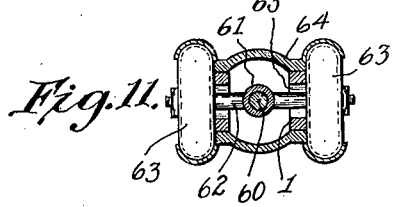
INVENTOR.
John W. Kuhn Patented Nov. 21, 1939

2,180,876

UNITED STATES PATENT OFFICE 2,180,876

INDIVIDUAL PNEUMATIC SUSPENSION SYSTEM

John W. Kuhn, Akron, Ohio, assignor to The Firestone Tire & Rubber Company, Akron, Ohio, a corporation of Ohio Application July 17, 1936, Serial No. 91,186

7 Claims. (Cl. 280—124)

This invention relates primarily to motor vehicles and particularly to spring suspension systems therefor, but the broad principles of the invention are also capable of utilization in railway cars and the like.

One of the primary objects of the invention consists in the provision of an individual pneumatic suspension system which may be substituted for conventional suspension systems now in common use.

A further object of the invention consists in providing automatic self-snubbing springs which are designed to possess high shock absorbing qualities and be controlled by manual or remote control to meet varying load requirements.

Another object of the invention resides in the provision of an independent suspension system in which the air pressure of the various spring units may be regulated to provide the desired stability, riding ease, according to various loads, average speed and road conditions.

Another object of the invention consists in combining with a pneumatic suspension system a leverage action, commonly termed "knee action", whereby skidding due to loss of traction is prevented.

Another object of the invention consists in providing a suspension system in which certain of the spring members are positioned in line with the vehicle wheels, thereby increasing the spring base without increasing the tread or wheel base, that is, the breadth or length of the conventional car.

A further object of the invention resides in the provision of a suspension system adapted to permit the car body to slightly elevate itself by its own inertia when rounding an improperly elevated curve, by placing the longitudinal axis of suspension materially above the longitudinal axis of weight.

Another object of the invention resides in the provision of means for resiliently mounting the rear axle and wheel assembly by counterbalancing it with the motor on pneumatic bearings, and permitting essential relative movement of the rear axle and wheel assembly and absorbing motor vibrational forces in the bearings.

Other objects and advantages of the invention will be apparent to those skilled in the art from the following description taken in connection with the accompanying drawings, in which, Figure 1 is a plan view of a chassis utilizing the conventional rigid axles, front and rear, and having the novel suspension system incorporated therein.

Figure 2 is a similar view of the system installed on a chassis having the conventional independent front wheel mounting.

Figure 3 is a side elevational view of the construction shown in Figure 1.

Figure 4 is a side elevational view of the construction shown in Figure 2.

Figure 6 is a front elevational view of the arrangement shown in Figures 2 and 4.

Figure 7 is a front elevational view of the arrangement shown in Figures 1 and 3.

Figure 8 is a transverse sectional view taken on line 8—8 of Figure 1 and looking in the direction of the arrows.

Figure 9 is a transverse sectional view taken on line 9—9 of Figure 1 and looking in the direction of the arrows.

Figure 10 is a front elevational view showing an arrangement in which the transversely extending spring of Figures 2, 4 and 6 may be utilized in conjunction with a rigid axle, and Figure 11 is a sectional view taken on line 11—11 of Figure 1 and showing the pneumatic bearings for suspending and supporting the motor and rear axle and wheel assembly.

Figure 5:
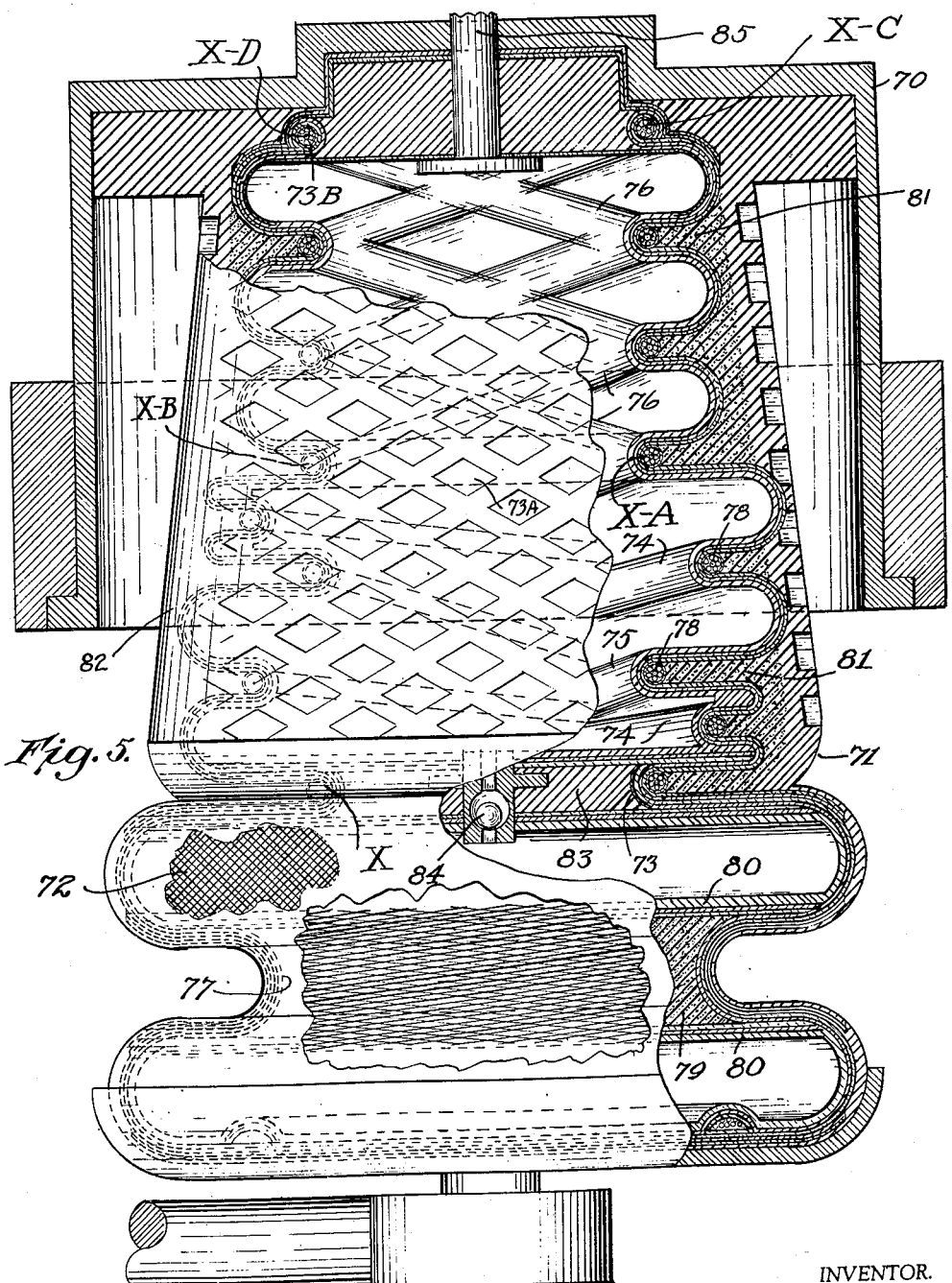
Figure 5 is an elevational view, partly in section, taken through one of the spring members on line 5—5 of Figure 2.

Referring to the drawings in greater detail, and particularly to Figures 1, 3, 7, 8 and 9, the numeral 1 indicates the chassis of an automobile, truck, or the like, provided with cross braces 2 and front and rear braces 3 and 4. Lateral extensions 5 are provided at the forward end of the chassis and extend to a point in line with the front wheels.

In the embodiment of the invention disclosed in Figures 1, 3, 7, 8 and 9, there are six sets of springs for the chassis, indicated generally by the numerals 10, 11, 12, 13, 14 and 15. These springs are of the pneumatic type and will be described in detail hereinafter.

Pivoted to the chassis 1, as at 16, are forwardly extending support rods 17 and 18. The rods 17 are supported on the front axle 19 and are curved outwardly as indicated at 20 so as to extend under the springs 10. The ends of rods 17 are provided with enlargements 21 for connection with rods 22 which in turn are connected to the bellows portions of the springs. The upper or casing portions of the springs are of course attached to the extensions 5 of the chassis, and it will be noted that the point of attachment is forward of the front wheel, and in alignment therewith. This forward location of the springs 10 tends to promote longitudinal stability for the car and prevent lunging forward when the brakes are suddenly applied. Also by placing the springs 10 in line with the wheels it will be apparent that lateral stability of the car is also improved.

Springs 11 are supported at their lower ends on the rods 17 at the points where these rods are connected to the axle 19, and their upper ends, that is the casing portions, are secured to the respective ends of the inverted U-shaped lever 23. This lever is pivoted at its mid-portion, as indicated at 24, in the uprights 25 which are fixed to the chassis. The dotted lines w—w and s—s on Figure 3 indicate the axis of weight and the axis of suspension of the vehicle, and it will be noted that the line s—s in which the pivot 24 is located is substantially above the axis of weight w—w. The lever 23 provides a leverage or knee action effect in that it transmits any shock received by either spring 11 to the pivot 24 which is in the axis of suspension.

Spring members 12 are secured at their lower ends to rods 18 and the casings for the upper ends of these springs are fixed to the ends of an inverted U-shaped lever 26. This lever is pivoted at its mid-portion 27 to the arched brackets 28 which are fixed to the chassis 1. The pivot point 27 is in line with pivot point 24, both being in the line of suspension s—s. It will be noted that the springs 12 are in alignment with the vehicle wheels and with spring 10 and they operate in conjunction with the latter in promoting lateral stability of the vehicle. Also, the lever 26 cooperates with the springs 12 to provide a knee-action effect similar to that of lever 23 and springs 11. The springs 11 and 12 and their associated levers also tend to lessen skidding and to level the vehicle when one of the wheels passes over a bump in the road. These results are accomplished by reason of the fact that an upward thrust on the springs on one side of the vehicle is transmitted into a downward thrust on the springs on the opposite side of the vehicle. This action creates an increased traction on the opposite wheel and also provides by reaction a centralized lift along the suspension line s—s.

The three pairs of springs 13, 14 and 15 at the rear of the vehicle are arranged in a manner somewhat similar to those at the front end and their action is identical with those at the front end. The lower ends of springs 13 are mounted on rods 30 which are pivoted to the chassis at 31 and to the rear axle at 32. These rods are provided with rearward extensions 33 connected by links 34 with a rod 35 pivoted to the rear end of the chassis. These rods are provided with enlargements 36 to which the lower ends of springs 13 and 15 are connected. The upper, or casing ends of the springs, are connected to a pair of reversely arranged lever members. One of these members consists of a tube 38 oscillatably mounted transversely of the chassis and provided with a forwardly extending arm 39 at the left of the vehicle and a rearwardly extending arm 40 at the right of the vehicle; the other of said members consists of a rod 41 oscillatably mounted in tube 38 and provided with a rearwardly extending arm 42 at the left of the vehicle and a forwardly extending arm 43 at the right side thereof. The upper ends of springs 13 are connected to lever arms 39 and 43, and the upper ends of springs 15 are connected to arms 40 and 42.

In the operation of these springs, if the left rear wheel goes over a rough spot in the road, as shown in Figure 4, the shock will be transmitted from left spring 13 through lever 39, tube 38, and lever 40 to a downward pressure on right spring 15; and the upward pressure on left spring 15 will be transmitted through lever 42, rod 41, and lever 43 to a downward pressure on right spring 13. It will thus be apparent that loss or decrease of traction on one rear wheel will be immediately compensated for by an increase of traction on the other rear wheel, just as is the case in connection with the front wheels as heretofore described. This leverage action of the rear springs is also effective in that it provides a lifting action and absorbs a portion of the shock in the springs on the side of the car body opposite to the bump or rough spot, thereby tending to maintain the car body in a level condition.

In addition to the rear springs 13 and 15, there is a pair of springs 14—14, similar to the springs 11—11 at the front of the vehicle. These springs 14 have their casings secured to the ends of the U-shaped lever 50, which is pivoted at its center to the upright brackets 51 as indicated at 52. The brackets are secured at their lower ends to the chassis 1, and the pivot point for the lever 50 is located in the line of suspension s—s of the car body. The lower ends of the springs 14 are secured to the discs 53 which are associated with the rear axle. As shown in Figures 1, 2 and 9, conventional radius rods 54, which are attached at their forward ends to the drive shaft housing 61, are connected in any suitable manner to the rear axle housing 38, and are provided with extensions 55 for supporting the discs 53 to which springs 14 are secured.

For the purpose of providing a spring suspension of the rear axle and wheel assembly a construction is employed which counterbalances these elements against the motor of the vehicle. The drive shaft is indicated by numeral 60 (Fig. 11) and extends through a casing 61 to which is fixed a transversely-extending rod 62. This rod carries two small pneumatic bearings 63 mounted in a metallic casing 64 attached to the chassis of the automobile, and the chassis is provided with openings 65 of sufficient diameter to allow adequate freedom of movement of the rod as the pneumatic bearings 63 are deformed. Mounted on the rear end of the cylindrical casing 61 and capable of rotative movement thereon is a sleeve 66 (Fig. 1) which has its rear end fixed to the axle housing, thereby providing freedom of movement of the housing with respect to the casing 61. The motor 67 is thus solely mounted on the above mentioned cushion bearings 63 and is connected with the forward end of drive shaft 60 and with the casing 61.

The foregoing construction not only provides a pneumatic bearing for counter-balancing the rear axle and wheel assembly against the motor, but also eliminates the use of universal joints in the drive shaft, and furthermore prevents motor vibration from being transmitted to the car body.

Before proceeding with the mounting of the springs in constructions involving independent front wheels (knee action), the construction of one of the springs per se will be described in detail.

An enlarged view of a spring suitable for use in the arrangement above described is shown in Figure 5. In this disclosure the numeral 70 indicates a metal casing which envelops the upper end of the spring member indicated generally by the numeral 71. The vertical length of the casing 70 may be varied as desired, but in Figure 5 is shown as extending over about one half the length of the spring. The member 71 is of generally cylindrical form and is built up of tire material including cord fabric plies, India rubber, rubber insulated wire, and sponge rubber.

The pneumatic spring 71 is built-up on a mandrel having the desired configuration and consists of a plurality of annular, spiral, and semi-annular beads. In building the spring a layer of rubber, preferably India rubber, is placed over and around the mandrel, then a layer of cord fabric ply, and then a second layer of cord fabric ply with the cords of the two plies extending in opposite directions and at an angle of about 45° to the horizontal, as indicated at 72 in Figure 5. The number of plies of cord fabric may of course be varied in accordance with the strength required. The several plies of material are placed over the mandrel to form beads 73, 74, 75, 76 and 77; certain of the beads being reinforced by rubberized or rubber insulated wire 78. The wire employed is preferably spring wire and is wound in spiral form to provide a coil spring construction.

Bead 77, which is of annular form, is reinforced with cord fabric, and it will be noted that the fabric is cut so that the individual cords make acute angles with the horizontal, and serve to retain the shape of the bead. As a further reinforcement of bead 77, sponge rubber 79 is inserted as a support for transverse reinforcing fabric 80. This construction in connection with bead 77 provides for greater flexibility and greater compressibility of this part of the spring.

Starting at point X (Figure 5), which indicates a given point of annular bead 73, the spring wires 78 extend in a left hand spiral form and merge into the annular bead 74ᴬ. These wires are a part of bead 74 and provide a spiral spring-like reinforcing member for the adjacent fabric of the casing. Bead 75 is similar to bead 74, but is of smaller diameter so as to permit the convolutions of bead 74 to overlap the convolutions of bead 75, thereby providing greater compressibility. The spiral windings of bead 75 also start at the point X and terminate at the point X—A. The beads 76 are formed by a series of rubber insulated spring wires wound in right and left hand spiral form. The left hand wires start from the point X—A and merge into annular bead 73ᴮ at point X—D, and the right hand group of wires start from point X—B and merge into the bead 73ᴮ at point X—C. Another group or series of right and left hand rubber insulated wires start and terminate at the same points as beads 76 and are identical; providing the diamond shape bead formation and consequent diamond shape rib. These beads are indicated by dotted lines. The right and left hand arrangement of these groups of spiral wires provide opposing forces which counteract each other when the spring is operated.

The spaces between the ribs formed by beads 74, 75 and 76 are filled with highly compressible sponge rubber 81 which facilitates resilient action and compressibility of the spring as a whole. The entire spring is covered with an outer layer 82 of India rubber which protects the inner fabrics from moisture and abrasion, and the upper portion of this layer may be provided with diamond-shaped, molded depressions on its exterior surface to enhance resilient action and compressibility. The ends of the casing constitute sheets of rubber which are continuations of the initial layer and are reinforced with fabric.

The inclosed spring casing described above is formed into upper and lower chambers by means of a partition 83. In this partition is a transverse passage provided with a ball check valve 84 to retard the flow of air from one chamber to the other and thereby provide a snubbing action in the spring. To accomplish this action the lower chamber is formed with a concave groove in its exterior surface, and a bead 77 of less cross sectional area than the beads of the upper chamber, thus providing less resistance to weight in the lower chamber, and greater compressibility (or ratio of compression) to air volume. On compression the air-pressure momentarily becomes greater in the lower chamber, thereby lifting valve 84 and equalizing with the air-pressure in the upper chamber. On the rebound valve 84 closes by gravity and a lower air-pressure formed in the lower chamber, the air-pressure then slowly equalizing in the two chambers by leakage around the ball valve 84 thereby snubbing the rebound, and slightly retarding compression.

The entire casing is molded and cured in a manner similar to pneumatic tires, and is then inserted in a housing such as indicated at 70 in Figure 5. Two or more of the casings may be maintained in communication by a flexible air hose 85, and the casings are inflated through the medium of a valve (not shown) in the hose.

Reverting to the mountings for the springs, and particularly to the modified construction shown in Figures 2, 4 and 6, the numeral 1 indicates a chassis identical with that shown in Figures 1, 3 and 7 except for the omission of the extensions 5. In this construction however, independent or knee-action wheels are mounted at the front of the chassis, and the rear springs are so arranged as to adapt the chassis to a four-door sedan body; that is, the springs are so designed as to permit the rear door of a sedan to be opened and closed in the usual manner.

The front springs are identical with those heretofore described except that the vertical springs 10 are omitted and a horizontal spring 90 substituted therefor. This spring is connected with the front wheel mountings by means of the vertical links 91 and the bell-crank levers 92 which latter are pivoted to the chassis. As either front wheel passes over a bump the force is transmitted through the respective link 91 and bell-crank 92 to the spring 90 and is thence translated into a downward thrust on the opposite wheel. This action momentarily increases the traction of the opposite wheel and offsets the loss of traction in the wheel passing over the rough spot in the road.

At the rear of the vehicle shown in Figures 2, 4 and 6, the vertical pneumatic springs 13 are omitted and in their place are mounted leaf springs 93. These springs 93 are fixed to the sleeve 38 and rod 41 just as were the springs 13, and their opposite ends are connected to rods 30 by the vertically-extending links 94. By thus eliminating the vertical springs 13 and substituting horizontal leaf springs 93 space is provided for operating the rear doors of a sedan, which would not be possible in the arrangement of Figs. 1 and 3.

In Figure 10 is shown a modification of the spring mountings in which the horizontal or transverse spring 90 of Figures 2, 4 and 6 is employed on a vehicle having the conventional rigid front axle 95. In this construction the bell-crank levers 92 are connected with links 96 which are in turn connected with the axle 95. The operation of this spring is identical with that disclosed in Figures 2, 4 and 6.

The operation of the various springs in absorbing shocks to the vehicle and the manner of increasing the traction of a wheel by reason of its opposing wheel being lifted from the road by a bump, etc., as well as the various other features of the invention, have been described in connection with the description of the various parts of the device and a repetition of the operation is believed to be unnecessary.

From the foregoing description and the accompanying drawings it will be apparent that I have devised a novel construction of pneumatic spring and mountings therefor; that the spring per se includes a self-snubbing feature; that the mounting for the springs is such as to increase the spring base both longitudinally and transversely without altering the wheel base of the vehicle; that the axis of suspension of the vehicle body is above the center of gravity of the vehicle, thereby permitting the body to slightly elevate itself by its own inertia in rounding a curve; and that skidding is greatly reduced by increasing the traction of certain of the wheels under described conditions.

In accordance with the patent statutes I have described the preferred embodiments of the invention, but inasmuch as various minor changes may be made in the details of construction without departing from the spirit of the invention it is intended that all such changes be included within the scope of the appended claims.

What I claim is:

1. A spring suspension system for vehicles including a chassis and running gear, said running gear including an axle and wheels, supports on the chassis extending to points in alignment with the wheels, spring devices connecting said supports and axle, and additional spring devices mounted adjacent the ends of the axle, and a lever pivoted to the chassis and having its ends connected to the last-named springs whereby an upward thrust on one of the latter springs will be converted into a downward thrust on the opposite spring.

2. A pneumatic spring suspension system for vehicles including a chassis and running gear including an axle and wheels, a pair of vertically arranged pneumatic springs and a horizontally arranged pneumatic spring, said springs being operatively connected between said chassis and running gear, a system of levers connecting the respective ends of the horizontal spring with the adjacent ends of the axle, one of the levers of each system comprising a U-shaped member partly encompassing one of the vertical springs.

3. A spring suspension system for vehicles including a chassis and running gear including an axle and wheels, a spring positioned at the front and rear of each wheel and connected with the axle, and levers pivoted intermediate their ends to the chassis and having their ends connected with opposed springs.

4. A spring suspension system for vehicles including a chassis and running gear including an axle and wheels, a spring positioned at the front and rear of each wheel and connected with the axle, levers pivoted intermediate their ends to the chassis, each lever having one of its ends connected to a spring at the rear of one of the wheels and its opposite end connected to a spring at the front of the wheel on the opposite side of the vehicle.

5. A spring suspension system for vehicles including a chassis and running gear including an axle and wheels, a spring positioned at the front and rear of each wheel and connected with the axle, a tube oscillatably mounted transversely of the chassis and having a forwardly-extending arm on one side of the chassis and a rearwardly-extending arm on the opposite side of the chassis, a rod extending through said tube and having a forwardly-extending arm on one side of the chassis and a rearwardly-extending arm on the opposite side of the chassis, and a spring connecting each of said arms with the axle.

6. A spring suspension system for vehicles including a chassis and running gear including an axle and wheels, vertically arranged pneumatic springs positioned at the rear of each wheel and leaf springs positioned at the front of each wheel, and means for connecting each spring with the axle and with the chassis.

7. In a suspension for a vehicle having an engine, a frame and a rear axle housing, a torque tube rigidly secured to said engine and to said axle housing, and a universal resilient connection between said torque tube and frame between said engine and rear axle housing whereby said engine is carried entirely by the front end of said torque tube.

JOHN W. KUHN.